United States Patent [19]

Ohkawa et al.

[11] 3,874,847
[45] Apr. 1, 1975

[54] PROCESS FOR DYEING ACID-MODIFIED POLYESTER FIBERS AND NOVEL THIAZOLEAZO-TYPE CATIONIC DYES

[75] Inventors: Masaaki Ohkawa, Takatauki; Seizo Konishi, Minoo; Sadaharu Abeta, Toyonaka; Tetuo Okaniwa, Minoo; all of Osaka, Japan

[73] Assignee: Sumitomo Chemical Company, Limited, Osaka, Japan

[22] Filed: Aug. 21, 1973

[21] Appl. No.: 390,265

[30] Foreign Application Priority Data
Aug. 30, 1972 Japan................................ 47-86996
May 31, 1973 Japan................................ 48-61530
May 31, 1973 Japan................................ 48-61531

[52] U.S. Cl..................... 8/41 C, 8/168, 260/158
[51] Int. Cl............................................. D06p 3/76
[58] Field of Search............................. 8/168, 41 C

[56] References Cited
UNITED STATES PATENTS
3,504,997  4/1970  Clapham............................... 8/21 R Primary Examiner—Donald Levy
Attorney, Agent, or Firm—Sughrue, Rothwell, Mion, Zinn & Macpeak

[57] ABSTRACT

A process for dyeing acid-modified polyester fibers comprising contacting the fibers with a dye bath containing a thiazoleazo-type cationic dye of the formula (I):

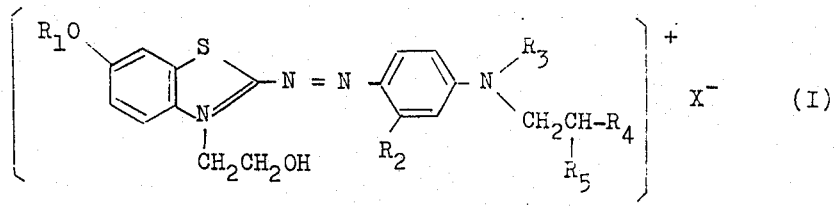

wherein $R_1$ and $R_3$ are each a $C_1 - C_2$ alkyl group, $R_2$ is a hydrogen atom, a $C_1 - C_2$ alkyl group or a $C_1 - C_2$ alkoxy group, $R_4$ is a hydrogen atom or a $C_1 - C_2$ alkyl group, $R_5$ is a hydroxyl group or a $C_1 - C_2$ alkoxy group, and $X^-$ is an anion. The dye compounds of the formula (I) dye acid-modified polyester fibers a bright shade and with good light fastness. The dye compounds of the Formula (I) wherein $R_2$ is a hydrogen atom or a methoxy or ethoxy group are novel dye compounds.

8 Claims, No Drawings

PROCESS FOR DYEING ACID-MODIFIED POLYESTER FIBERS AND NOVEL THIAZOLEAZO-TYPE CATIONIC DYES

BACKGROUND OF THE INVENTION

1. Field of the Invention

The present invention relates to a method for dyeing acid-modified polyester fibers with a cationic dye bath containing new dye compounds, and more particularly, to a method for dyeing acid-modified polyester fibers with a specific thiazoleazo cationic dye.

2. Description of the Prior Art

Of the various synthetic fibers available, the demand for polyester fibers increases every year due to the superior properties of polyester as a fiber. The fiber is rendered dyeable with a cationic dye by modifying the fiber with acidic substances, as disclosed in, for example, Japanese Patent Publication No. 10497/59. Acid modified polyester fibers, as disclosed hereinbefore and in U.S. Pat. No. 3,018,272 are well known. Cationic dyes for acid-modified polyester fibers should have the following superior properties to those of conventional cationic dyes:

i. higher fastness to light on the acid-modified polyester fiber, ii. less decomposition during a high temperature dyeing, iii. good compatibility with other dyes of different shade (the same dyeing rate), and iv. less staining of or less decomposition due to other fibers such as wool or regular polyester fibers frequently used in blends with acid-modified polyester fibers.

As disclosed in German Offenlegungsschrift 2,129,271 and Belgian Patent 728,033, it is well known that thiazoleazo-type cationic dyes can be applied on acid-modified polyester fibers. On the other hand, it is also well known that dyes having a structure similar to the present dyes can be advantageously applied on acrylic fibers, as disclosed in Japanese Patent Publication No. 15791/71, Netherlands Specification 6,608,698 and British Patent 787,369 in addition to the above two patents. However, these dyes useful for dyeing acrylic fibers are not necessarily useful for dyeing acid-modified polyester fiber, because the dyes, particularly the blue dyes thereof, give dyeings of lower fastness to light on the fiber than on acrylic fiber, and, moreover, the dyes should be applied on the fiber, by a high temperature dyeing (110°–130°C) or a carrier dyeing, under more severe conditions than used with acrylic fiber at 90° to 100°C.

It is necessary, therefore, for the dyes to have higher fastness to light and higher stability to high temperature than required for acrylic fiber in order to apply on acid-modified polyester fiber.

The acid-modified polyester fiber is more frequently used in blends with other fibers such as wool, other types of polyester or cellulose than is acrylic fiber, and effects of these fibers used in the blends on the cationic dyes during dyeing cannot be ignored. For example, the dyes are sometimes decomposed by a reductive group present in the blend fibers.

The inventors have studied the dyeing of acid-modified polyester fibers using thiazoleazo-type blue dyes, and have found that the blue dyes were exhausted so much faster than the other cationic dyes of different shades that level dyeings did not result and these dyes were not suitable for a combination dyeing. In addition, it was found that the same phenomenon was also observed when these dyes were applied to acrylic fibers in trichromatic dyeing as one of the three primary colors compatible with one another.

In addition, the inventors found that dyeings of lower fastness to light on the fiber than on acrylic fiber resulted. These factors are, of course, completely due to the differences between acrylic fiber and acid-modified polyester fiber as can be understood from the comparative data shown in Table 1 hereinafter.

It is clear from the above that the conventionally employed thiazoleazo-type blue dyes cannot be used satisfactorily as a dye for acid-modified polyester fibers. The inventors studied general purpose thiazoleazo-type blue dyes for use with acid-modified polyester fibers and completed the present invention.

SUMMARY OF THE INVENTION

It is generally well known that thiazoleazo-type cationic dyes are used for dyeing acid-modified polyester fiber, however, their fastness and dyeing properties are not satisfactory. As a result of a study on new thiazoleazo-type blue dyes for acid-modified polyester fiber having desirable fastness and dyeing properties, the inventors found that the specific dye compounds of the Formula (I) below have very good properties and can be used in a dyeing process for acid-modified polyester fibers.

The thiazoleazo-type cationic dyes of this invention used in the dyeing process of this invention for acid-modified polyester fibers are represented by the following Formula (I)

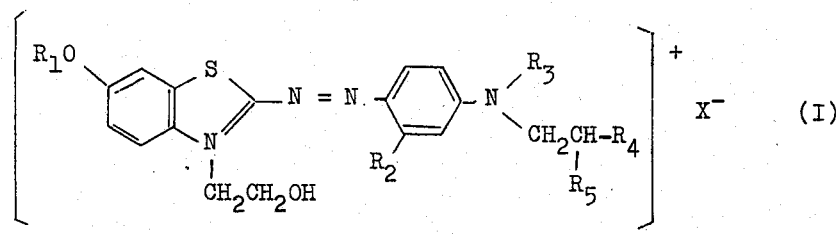

wherein $R_1$ and $R_3$ are each a $C_1$–$C_2$ alkyl group, e.g., methyl or ethyl group, $R_2$ is a hydrogen atom, a $C_1$–$C_2$ alkyl group, e.g., a methyl or ethyl group, or a $C_1$–$C_2$ alkoxy group, e.g., a methoxy or ethoxy group, $R_4$ is a hydrogen atom or a $C_1$–$C_2$ alkyl group, e.g., a methyl or ethyl group, $R_5$ is a hydroxyl group or $C_1$–$C_2$ alkoxy group, e.g., a methoxy or ethoxy group, and $X^-$ is an anion.

The most important structure features of the dye compounds of the Formula (I) of the present invention are that the nitrogen atom constituting the thiazole nucleus is quarternized with a hydroxyethyl group and that the $R_5$ substituent is a hydroxy group or a methoxy or ethoxy group, however, they can display their fuctions to the utmost even when they have the structure of the Formula (I) as a whole. The dye compounds can be prepared by well-known methods, for example, by diazotizing 2-amino-benzthiazole in an acid medium, coupling the reaction product with aniline derivatives, and then quarternizing the resultant azo compounds with ethylene oxide in an acid medium.

The present dye compounds give dyeings of a bright blue shade, have high heat stability thus permitting their use in hot water and high fastness to light on the fiber, and have quite an appropriate dyeing rate (compatibility) with other dyes normally used for dyeing acid-modified polyester fibers. Furthermore, they stain other fibers which may be present in a dyeing bath less, and they are very stable to reductive fibers such as wool. Therefore, the present dye compounds have advantages that they can give level and bright dyeings on acid-modified polyester fiber on dyeing of blends of the fiber with a reductive fiber.

Moreover, the present dye compounds can advantageously be used not only alone or in combination, byt also for dyeing acid-modified polyester fiber alone or blends of the fiber, such as wool blends. The dye compounds can be said to be very valuable dyes having a wide range of application.

However, they are not as useful for dyeing polyacrylonitrile fiber, because they have a much too slow dyeing rate to be compatible with other dyes used in a combination dyeing with acrylonitrile fibers.

As described above, the present invention also relates to a process for dyeing acid-modified polyester fiber with dyes of the Formula (I). Polyester fiber is rendered dyeable with cationic dyes by modifying the fiber with acidic substances. Such fibers which are modified with acidic substances are well known and are commercially available as Dacron T-64, (designated in U.S. Pat. No. 3,357,782, col. 3, line 40 et seq. as the reaction product of polyester and sulfoxisophthalic acid) Dacron T-65 and Dacron T-92 (trade mark, produced by the E. I. du Pont de Nemours, Co., Inc.).

Among the present dyes of the Formula (I), the dyes of the Formula (I');

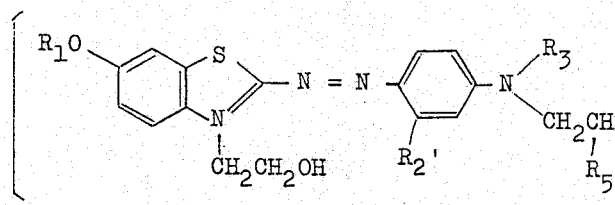

wherein $R_1$, $R_3$, $R_4$, $R_5$ and $X^-$ are each as defined above, and $R_2'$ is a hydrogen atom, methoxy or ethoxy group, are new dyes.

The two dye compounds (I') and (I) can be prepared by diazotizing a 2-aminobenzthiazole of the Formula (II),

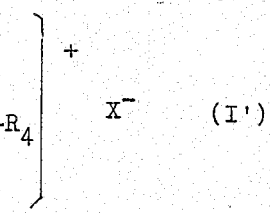

wherein $R_1$ is a methyl or ethyl group, using conventional techniques, reacting the resultant diazo compound with anilines of the Formula (III),

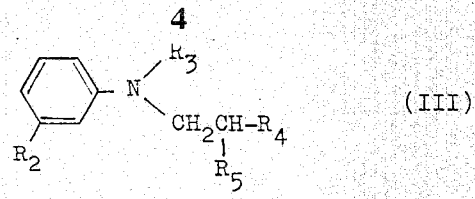

wherein $R_2$ is a hydrogen atom, a methyl, ethyl, methoxy or ethoxy group, $R_3$ is a methyl or ethyl group, $R_4$ is a hydrogen atom, a methyl or ethyl group, and $R_5$ is a hydroxyl, methoxy or ethoxy group, reacting the resultant compounds of the Formula (IV),

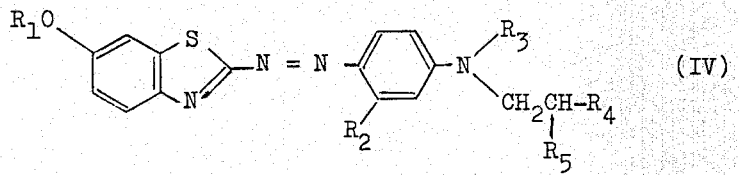

wherein $R_1$, $R_2$, $R_3$, $R_4$ and $R_5$ are each as defined above, with ethylene oxide in the presence of acid in a solvent, and then salting out of the product.

The compounds of the Formula (II) include 6-methoxy-2-aminobenzthiazole, and 6-ethoxy-2-aminobenzthiazole. The process conditions and the like are disclosed in German Offenlegungsschrift 2,129,271.

The compounds of the Formula (III) include N,N-ethyl-β-oxyethylaniline, N,N-ethyl-β-oxypropylaniline, N,N-ethyl-β-oxy-n-butylaniline, N,N-methyl-β-oxyethylaniline, N,N-methyl-β-oxypropylaniline, N,N-methyl-β-oxy-n-butylaniline, N,N-ethyl-β-oxyethyl-m-toluidine, N,N-ethyl-β-oxypropyl-m-toluidine, N,N-ethyl-β-oxy-n-butyl-m-toluidine, N,N-methyl-β-oxyethyl-m-toluidine, N,N-methyl-β-oxypropyl-m-toluidine, N,N-methyl-β-oxybutyl-m-toluidine, N,N-methyl-β-oxyethyl-m-ethylaniline, N,N-ethtyl-β-oxyethyl-m-ethylaniline, N,-N-methyl-β-oxyethyl-m-phenetidine, N,N-ethyl-β-oxyethyl-m-phenetidine, N,N-methyl-β-oxypropyl-m-phenetidine, N,N-ethyl-β-methoxyethylaniline, N,N-ethyl-β-methoxypropylaniline, N,N-ethyl-β-methoxy-n-butylaniline, N,N-methyl-β-methoxyethylaniline, N,-N-methyl-β-methoxypropylaniline, N,N-methyl-β-butylaniline, N,N-methyl-β-ethoxyethylaniline, N,N-methyl-β-ethoxypropylaniline, N,N-methyl-β-ethoxy-n-butylaniline, N,N-ethyl-β-ethoxyethylaniline, N,N-ethyl-β-ethoxypropylaniline, N,N-ethyl-β-methoxyethyl-m-toluidine, N,N-methyl-β-methoxyethyl-m-toluidine, N,N-methyl-β-ethoxyethyl-m-toluidine, N,N-methyl-β-ethoxyethyl-m-toluidine, N,N-methyl-β-methoxyethyl-m-phenetidine, N,N-ethyl-β-methoxyethyl-m-phenetidine, N,N-methyl-β-methoxyethyl-m-methylaniline, N,N-methyl-β-ethoxyethyl-m-ethylaniline, N,N-ethyl-β-methoxyethyl-m-ethylaniline, N,N-ethyl-β-ethoxyethyl-m-ethylaniline, N,N-methyl-β-methoxyethyl-m-anisidine, N,N-ethyl-β-methoxyethyl-m-anisidine, N,N-methyl-β-oxyethyl-m-anisidine, N,N-ethyl-β-oxyethyl-m-anisidine, N,N-methyl-β-ethoxyethyl-m-anisidine, and N,N-ethyl-β-ethoxyethyl-m-anisidine.

Specific examples of the dyes of the Formula (I) are set forth below:

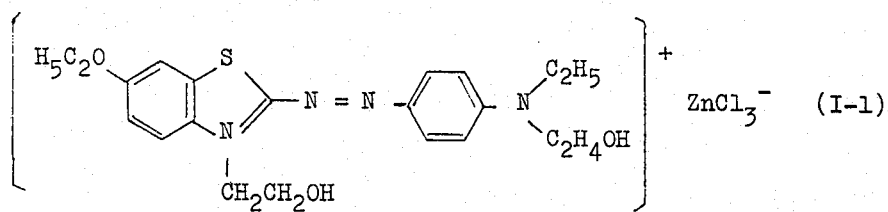
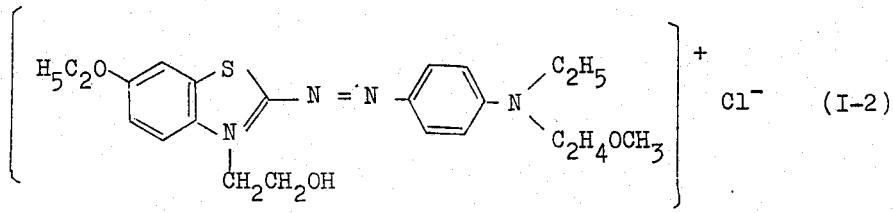
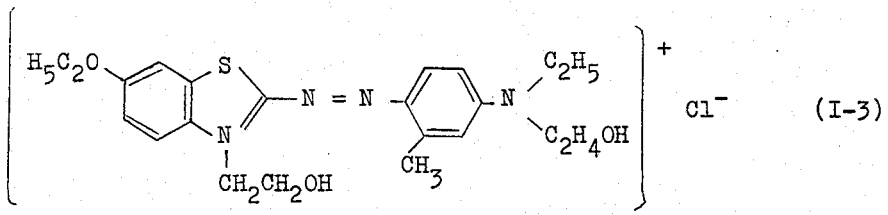
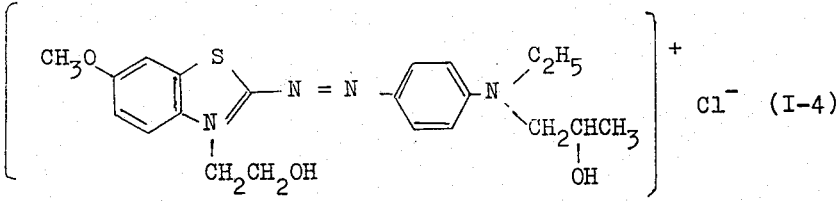
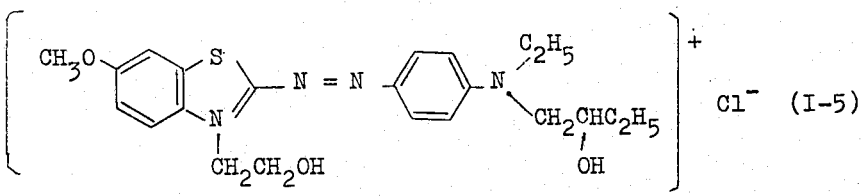
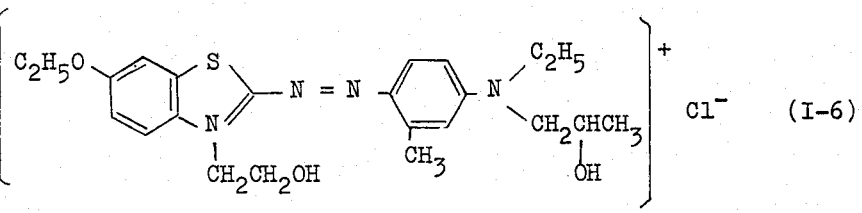
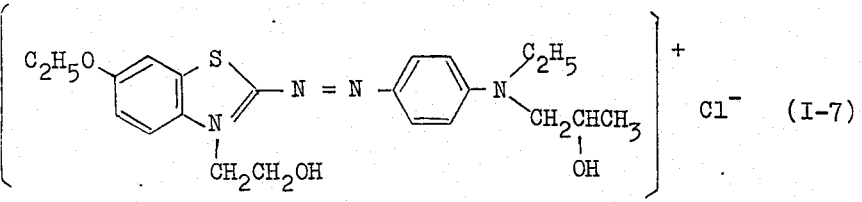
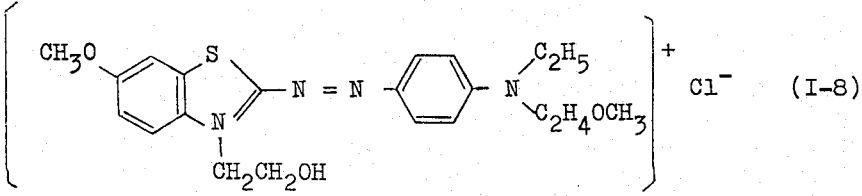

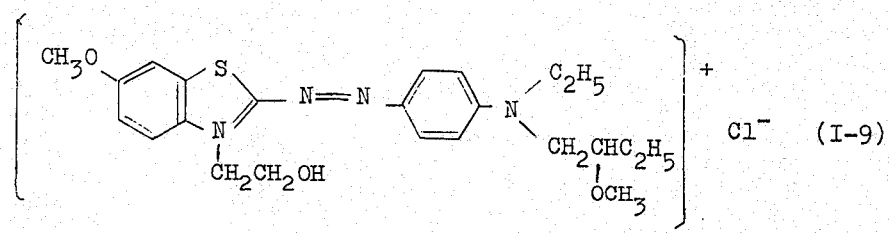
(I-9)
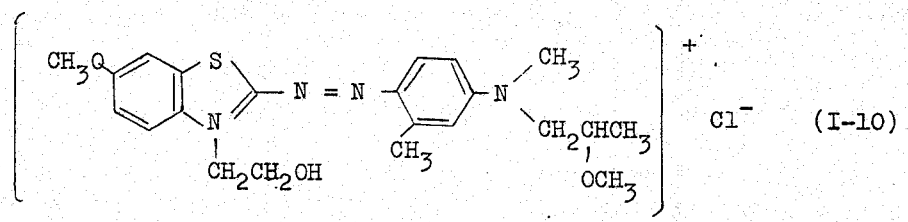
(I-10)
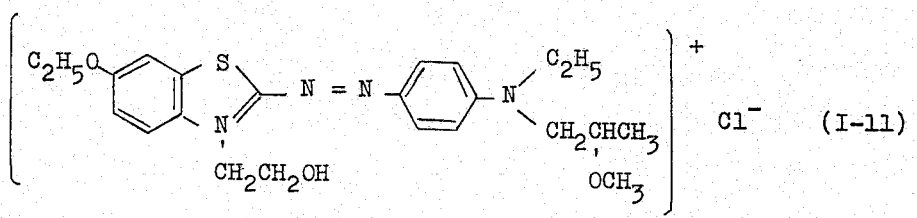
(I-11)
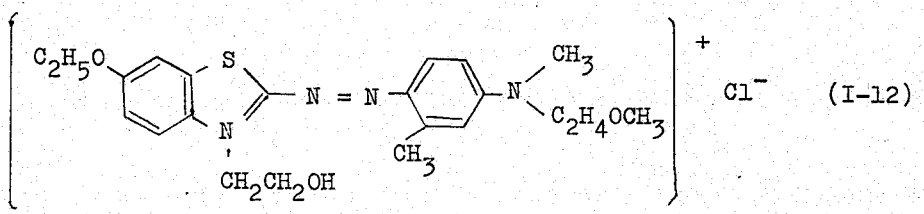
(I-12)
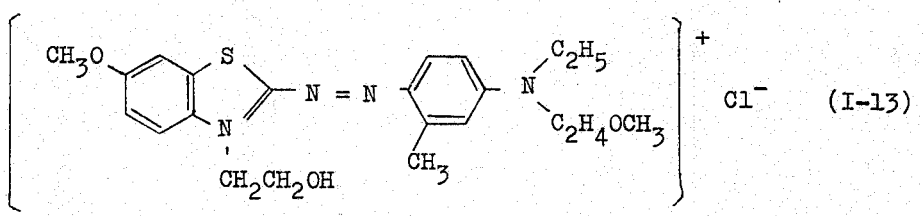
(I-13)
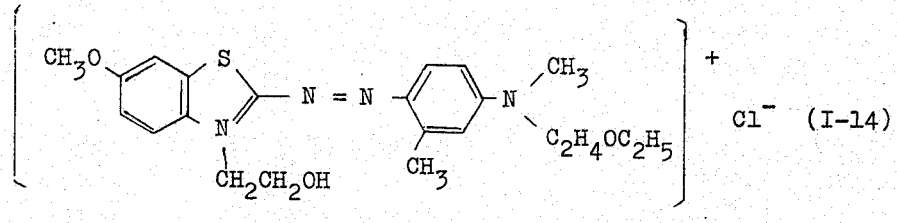
(I-14)
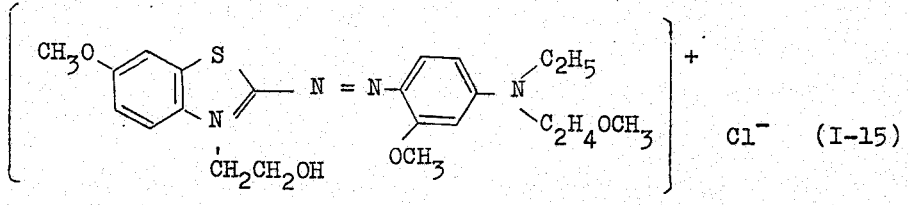
(I-15)
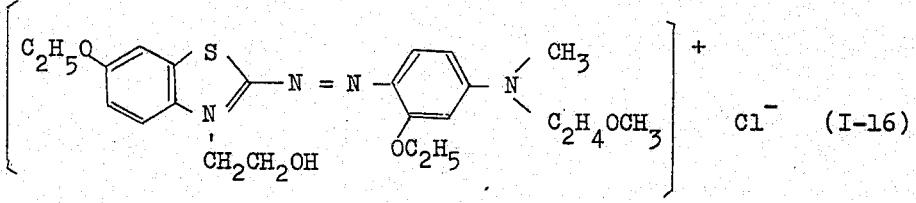
(I-16)

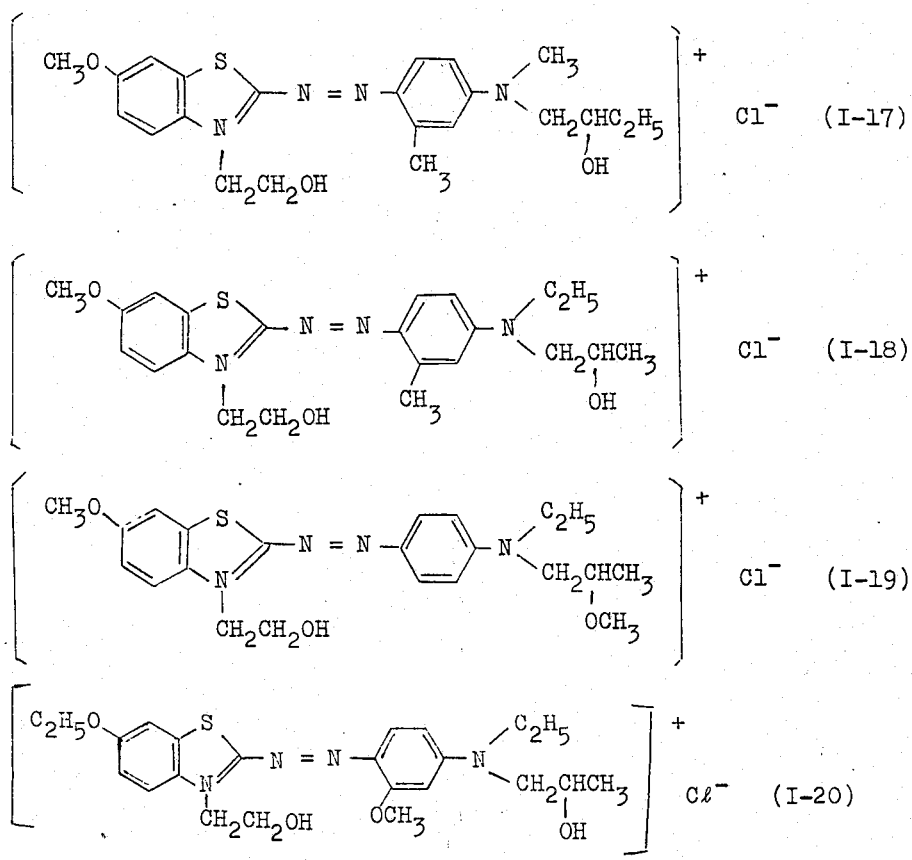

Among the present dyes of the Formula (I), the dyes wherein $R_1$ and $R_3$ are each an ethyl group, $R_4$ is a hydrogen atom, $R_2$ is a hydrogen atom or methyl group, and $R_5$ is a hydroxyl group or a methoxy group, are especially preferred because of economic reasons, heat stability and dyeing rate.

Suitable examples of the anion, X, are chlorine ion, bromine ion, iodine ion, hydroxyl ion, carbonate ion, bicarbonate ion, sulfate ion, bisulfate ion, perchlorate ion, phosphate ion, phosphomolybdate ion, phosphotungstate molybdate ion, oxalate ion, acetate ion, maleate ion, propionate ion, benzenesulfonate ion or a complex ion such as, e.g., $ZnCl_3^-$. A chlorine ion or $ZnCl_3^-$ is preferred.

Acid-modified polyester fibers can be dyed with the present dyes, using the conventional process, at a bath temperature of 110° to 130°C in a dyeing bath containing the present dyes of 0.1 to 5% o.w.f. In the process, it is preferred to adjust the pH of the dyeing bath to 3.5 to 5.0 with a buffer such as a sodium acetate-acetic acid buffer, a sodium phosphate-phosphoric acid buffer, etc., and in some cases Gauber's salt may be added to the dyeing bath to maintain the stability of fiber.

A small amount of cationic-type retarder such as derivatives of higher fattey acids having from about 10 to 15 carbon atoms may be added to reduce the rate of dyeing, where desired. The present dyes can be applied to carrier dyeing. Carrier dyeing is a well-known technique, for example, as disclosed in British Patent No. 1,192,168. It is preferred, in this case, that the carrier be present at a level of 5 to 20 percent o.w.f., the bath temperature be 90° to 110°C and the pH of the bath be 3.5 to 5.0. Preferred carriers are nonionic type carriers such as the biphenyl type nonionic carrier commercially available as Calorid ELF-C, produced by Tanatex Co., Ltd.

The present dyes can advantageously be applied, in the form of a higher aliphatic acid salt thereof, for example, the alkali metal salts, e.g., the sodium and potassium salts of higher aliphatic carboxylic acids having about 10 to 15 carbon atoms, to a solvent dyeing process for the fiber together with a small amount of water (e.g., 40–100 percent o.w.f.) and halogenated hydrocarbon, for example, trichloroethylene, tetrachloroethylene, etc.

The present invention will be illustrated more specifically by reference to the following examples which are only given for the purposes of illustration and are not to be interpreted as limiting. In the examples, all parts and percents are by weight.

EXAMPLE 1

To 44.4 parts of a compound of the formula,

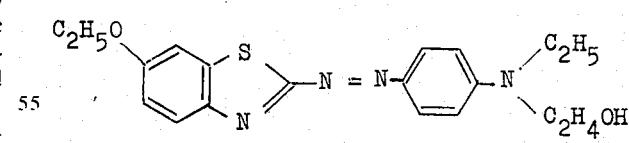

were added 45.0 parts of glacial acetic acid and 33.4 parts of 90 percent formic acid, and the mixture was heated to 40° to 50°C while stirring. 37.0 parts of ethylene oxide were passed therethrough slowly at the same temperature, and thereafter the reaction was further continued at 30° to 40°C for about 4 hours. The reaction mixture was discharged into 1200 parts of water, treated with activated carbon and salted out with 120 parts of sodium chloride and 30 parts of zinc chloride. A cationic dye of the Formula (I) was obtained in a good yield.

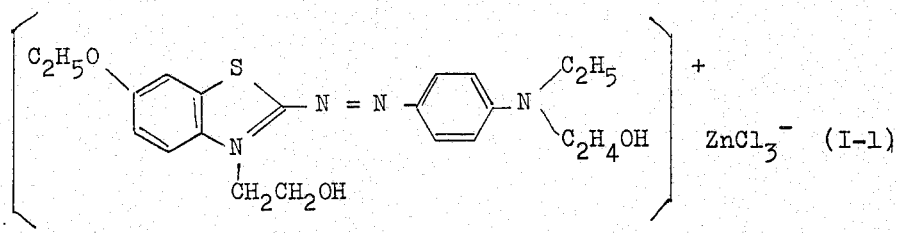

The concentrated cationic dye, thus obtained, was diluted with sodium sulfate, sodium chloride and dextrin at a level of about 4 times by weight so as to equal the strength of a commercially available cationic dye. 0.2 parts of the dye was dissolved in 500 parts of water, and the solution was adjusted to a pH of 4 to 5 with an acetic acid-sodium acetate buffer to prepare a dyeing bath. 10 parts of Dacron T-92 (modified polyester fiber, trade mark of du Pont, dyeable with cationic dye) was introduced therein and dyed at 120°C for 40 minutes. As shown in Table 2, the dye gave dyeings of a bright blue shade and good light fastness on Dacron T-92, and also gave little staining on wool and Tetoron, a regular polyester by Toray Industries, Inc. and Teijin Ltd.

The present dye showed high stability to hot water required on a high temperature dyeing of modified polyester fiber. Furthermore, it was found from the following test that the dye showed higher level property than well-known conventional dyes (A), (B) and (C).

and a well-known red dye (E) of the following formula

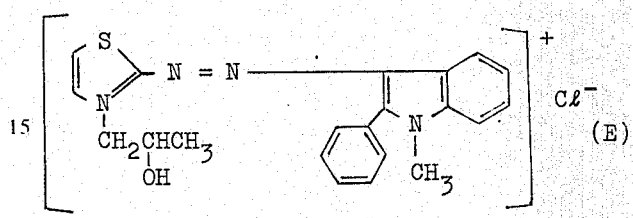

Three dyeing baths (bath ratio 1 : 50) were prepared which consisted of 0.1 part of the dye of the Formula (I-1), 0.1 part of C.I. Basic Yellow 28, and an acetic acid-sodium acetate buffer for adjusting the pH of the baths to 4. 10 parts of Dacron T-92 was introduced into each of the dyeing baths which was then heated, at a rate of 1°C/min., from 80° to 100°C, 105° and 120°C, respectively. The dyed materials were removed from the baths when the temperature reached 100°C for one bath, 105°C for another bath, and for the last bath after British Patent 787,369
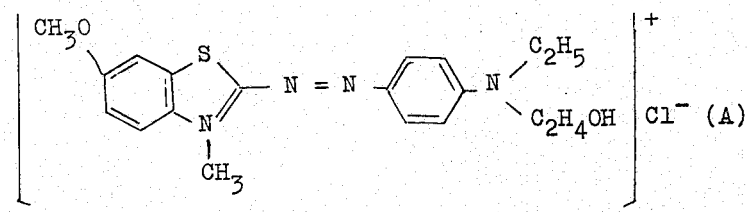

British Patent 787,369
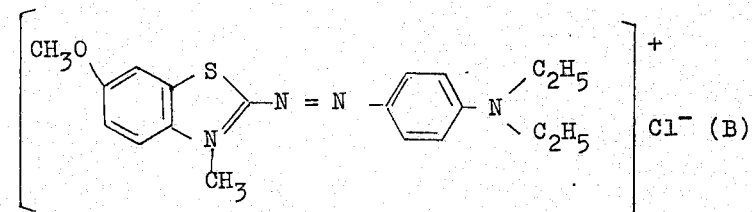

Japanese Patent Publication No. 15791/71
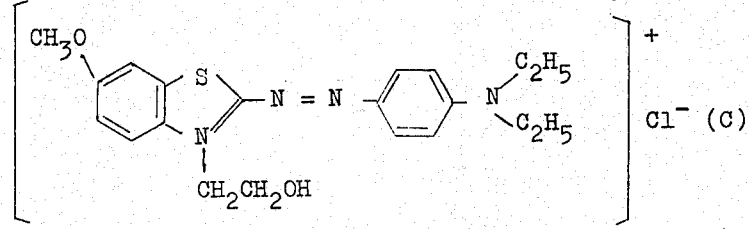

and good compatibility with a well-known yellow dye (D), Sumiacryl Golden Yellow N-GL (C.I. Basic Yellow 28, a product of Sumitomo Chemical Co., Ltd., Japan)

40 minutes at 120°C. Then new samples of Dacron T-92 were introduced into the residual baths and dyed. Good results were obtained, that is, a comparison between the green shades of the first samples dyed and

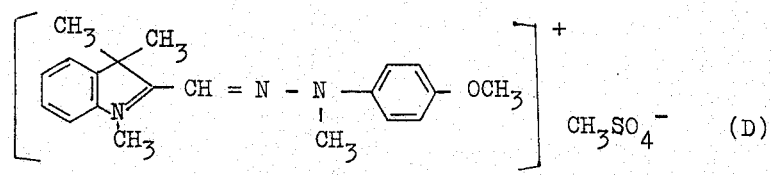

second samples dyed at each dyeing temperature showed that the difference between the two was not a difference in shade but in depth.

However, when the same procedure was carried out except that the well-known blue dye (A), (B) or (C) was used instead of the blue dye of the Formula (I-1), a large change in the shade was observed such as a more yellowish shade with the shorter period of dyeing and a more bluish shade with the longer period of dyeing.

EXAMPLE 2

A dye of the following Formula

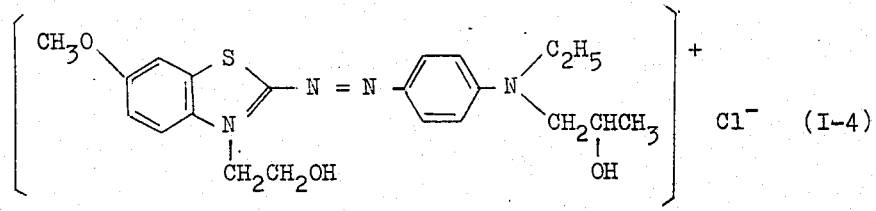

gave dyeings of a bright blue shade and good light fastness on polyacrylonitrile fibers. The dye, prepared in the same way as described in EXAMPLE 1, gave bright blue dyeings on Dacron T-92 having higher fastness to light and higher stability to hot water than those of well-known dyes. The dye also showed good compatibility with other dyes, e.g., the yellow and red dyes described in Example 1 and little staining on other fibers using the same test as described in Example 1. The results obtained are shown in Table 2.

The dyeing properties of the present dyes which were dyed in the same way as described in Example 1 are as shown in Table 2.

EXAMPLE 3

To 46.1 parts of a compound of the formula,

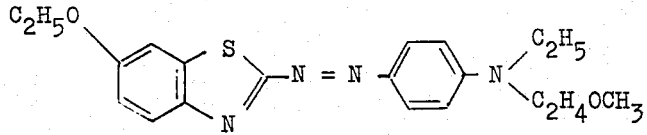

were added 45.0 parts of glacial acetic acid and 33.4 parts of 90 percent formic acid, and the mixture was heated to 40° to 50°C while stirring. 37.0 parts of ethylene oxide was passed therethrough slowly at the same temperature, and thereafter the reaction was further continued at 30° to 40°C for about 4 hours. The reaction mixture was discharged into 1200 parts of water, treated with activated carbon and salted out with 200 parts of sodium chloride. A cationic dye of the formula was obtained.

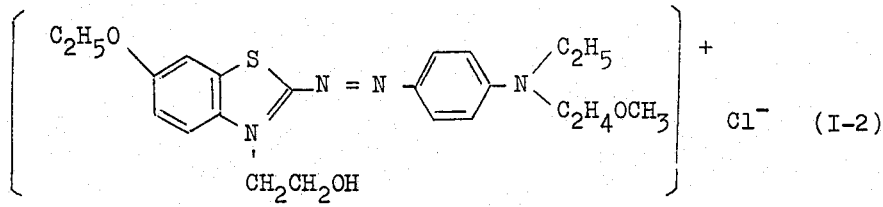

The concentrated cationic dye thus obtained was diluted with a suitable diluent to equal the strength of a commercially available cationic dye.

0.2 parts of the dye was dissolved in 500 parts of water, and the solution was adjusted to a pH of 4 to 5 with an acetic acid-sodium acetate buffer to make a dyeing bath. 10 parts of Dacron T-65 (trade mark, a modified polyester fiber dyeable with cationic dyes, a product of du Pont) was introduced therein, and dyed at 120°C for 40 minutes. As shown in Table 1, the dye gave dyeings of a bright greenish blue shade on Dacron T-65 having good light fastness and stability to hot water. Furthermore, the dye was stable to reductive fibers such as wool, and gave bright and level dyeings on a blend of Dacron T-65 with the reductive fiber.

EXAMPLE 4

0.2 parts of a dye of the following formula,

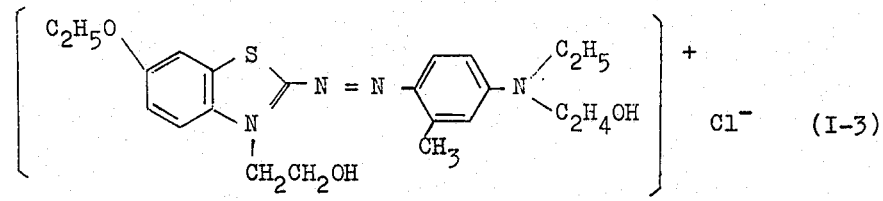

was dissolved in 500 parts of water and the solution was adjusted to a pH of 4 to 5 with an acetic acid-sodium acetate buffer. 10 parts of Dacron T-64 (trade mark of modified polyester fiber dyeable with cationic dyes produced by du Pont) was introduced therein and dyed at 120°C for 40 minutes. The dye gave bright blue and level dyeings on Dacron T-64 having good light fastness and little staining on wool and Tetoron, as shown in Table 1.

The dye also showed very good stability to hot water as required on a high temperature dyeing of modified polyester fiber.

EXAMPLE 5

A dye of the following formula

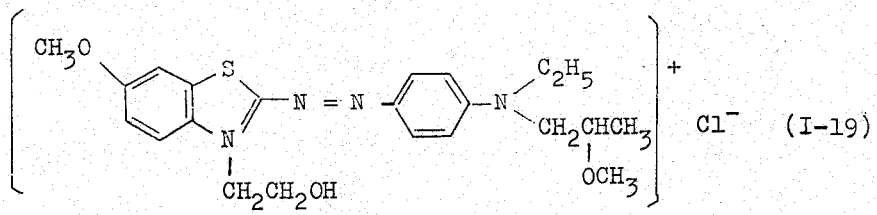

EXAMPLE 6

A dye of the following formula,

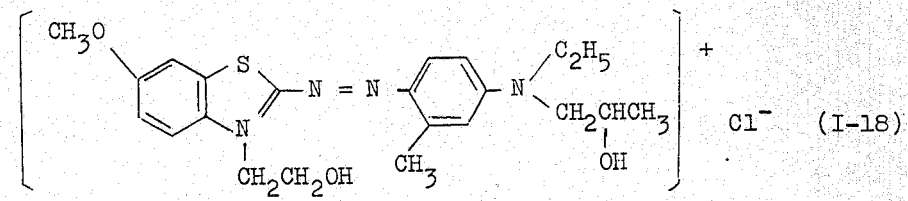

prepared in the same manner as described in Example 3 gave bright blue dyeings on polyacrylonitrile fiber having a good light fastness. When the dye was applied to dyeing of Dacron T-65 in the same way as described in Example 3, bright blue and level dyeings having higher fastness to light and higher stability to hot water than those of the well-known dyes, as shown in Table 1, were obtained.

The dyeing properties of the present dyes which were dyed in the same way as described in Example 1 are as shown in Table 3.

gave bright blue dyeings on polyacrylonitrile fiber having good light fastness. When the dye was applied to dyeing of Dacron T-64 in the same way as described in Example 1, it gave bright blue dyeings thereon having higher fastness to light and higher stability to hot water than those of the well-known dyes as shown in Table 1. The dye also showed good compatibility with other dyes and little staining on other fibers in the same test as described in Example 1.

The dyeing properties of the present dyes which were dyed in the same way as described in Example 1 are as shown in Table 4.

Table 1
Dyeing Properties of the Present Dyes

| Dye | Structural Formula | Stability to Hot Water[1] | | Light-Fastness[2] |
|---|---|---|---|---|
| | | 100°C X 40 min. | 120°C X 40 min. | |
| Dye (I-1) Present Invention (Example 1) | $[H_5C_2O\text{-benzothiazole-}N=N\text{-}C_6H_4\text{-}N(C_2H_5)(C_2H_4OH)]^+ \; ZnCl_3^-$ with $CH_2CH_2OH$ on N | 95 | 90 | 5 |
| Dye (I-2) Present Invention (Example 3) | $[H_5C_2O\text{-benzothiazole-}N=N\text{-}C_6H_4\text{-}N(C_2H_5)(C_2H_4OCH_3)]^+ \; Cl^-$ with $CH_2CH_2OH$ on N | 95 | 92 | 5 |
| Dye (I-3) Present Invention (Example 4) | $[H_5C_2O\text{-benzothiazole-}N=N\text{-}C_6H_3(CH_3)\text{-}N(C_2H_5)(C_2H_4OH)]^+ \; Cl^-$ with $CH_2CH_2OH$ on N | 98 | 95 | 5 |
| Ger. Offen. 2,129,271 | $[H_5C_2O\text{-benzothiazole-}N=N\text{-}C_6H_4\text{-}N(C_2H_5)(C_2H_4OH)]^+ \; Cl^-$ with $CH_2CH(OH)C_2H_5$ on N | 90 | 60 | 4 - 5 |
| Ger. Offen. 2,129,271 | $[H_5C_2O\text{-benzothiazole-}N=N\text{-}C_6H_4\text{-}N(C_2H_5)(C_2H_4OCH_3)]^+ \; Cl^-$ with $CH_2CH(OH)C_2H_5$ on N | 90 | 60 | 4 - 5 |

Table 1 (cont'd)

| Dye | Structural Formula | Stability to Hot Water[1] 100°C X 40 min. | Stability to Hot Water[1] 120°C X 40 min. | Light-Fastness[2] |
|---|---|---|---|---|
| Ger. Offen. 2,129,271 | $[H_5C_2O\text{-benzothiazole-}N=N\text{-}C_6H_3(CH_3)\text{-}N(C_2H_5)(C_2H_4OH)]^+ Cl^-$ with N-substituent $CH_2CH(OH)\text{-}C_2H_5$ | 95 | 80 | 4 – 5 |
| Ger. Offen. 2,129,271 | $[H_5C_2O\text{-benzothiazole-}N=N\text{-}C_6H_4\text{-}N(C_2H_5)(C_2H_4OH)]^+ Cl^-$ with N-substituent $CH_2CHCH_2OCH_3$ with OH | 90 | 60 | 4 – 5 |
| Belgian Patent 728,033 | $[H_5C_2O\text{-benzothiazole-}N=N\text{-}C_6H_4\text{-}N(C_2H_4Cl)_2]^+ Cl^-$ with N-substituent $CH_2CH_2OH$ | 80 | 60 | 4 |
| Netherlands Specification 6,608,698 | $[H_5C_2O\text{-benzothiazole-}N=N\text{-}C_6H_4\text{-}N(C_2H_5)(C_2H_4OH)]^+ Cl^-$ with N-substituent $CH_2CHCl\text{-}OH$ | 90 | 70 | 4 |

Note:

1) The ratio of the absorbances at $\lambda_{max}$ determined before and after the treatment.

2) Rated according to JIS L 0841.

Table 2

Dyeing Properties of the Present Dyes

| Dye | | Structural Formula | Light-fastness[1] Medium | Light-fastness[1] Deep | Stability to Hot water[2] Medium | Stability to Hot water[2] Deep | Staining[3] Wool | Staining[3] Teto-ron |
|---|---|---|---|---|---|---|---|---|
| Conventional Dyes | (A) British Patent 787,369 | $[CH_3O\text{-benzothiazole-}N=N\text{-}C_6H_4\text{-}N(C_2H_5)(C_2H_4OH)]^+ Cl^-$ with N-$CH_3$ | 4-5 | 4-5 | 90 | 90 | 3-4 | 3-4 |
| | (B) British Patent 787,369 | $[CH_3O\text{-benzothiazole-}N=N\text{-}C_6H_4\text{-}N(C_2H_5)_2]^+ Cl^-$ with N-$CH_3$ | 4-5 | 4-5 | 90 | 90 | 3-4 | 3-4 |
| | (C) Japanese Patent Publication 15791/71 | $[CH_3O\text{-benzothiazole-}N=N\text{-}C_6H_4\text{-}N(C_2H_5)_2]^+ Cl^-$ with N-$CH_2CH_2OH$ | 4-5 | 4-5 | 50 | 55 | 4-5 | 4-5 |
| Present Dyes | Dye (I-1) (Example 1) | $[C_2H_5O\text{-benzothiazole-}N=N\text{-}C_6H_4\text{-}N(C_2H_5)(C_2H_4OH)]^+ ZnCl_3^-$ with N-$CH_2CH_2OH$ | 4-5 | 5 | 90 | 93 | 4-5 | 5 |
| | Dye (I-4) (Example 2) | $[CH_3O\text{-benzothiazole-}N=N\text{-}C_6H_4\text{-}N(C_2H_5)(CH_2CHCH_3 OH)]^+ Cl^-$ with N-$CH_2CH_2OH$ | 4-5 | 5 | 92 | 92 | 4-5 | 5 |

Table 2 (Cont'd)

| Dye | | Structural Formula | Light-fastness[1] | | Stability to Hot Water[2] | | Staining[3] | |
|---|---|---|---|---|---|---|---|---|
| | | | Medium | Deep | Medium | Deep | Wool | Tetoron |
| Present Dyes | Dye (I-5) | $[CH_3O\text{-benzothiazole-}N=N\text{-}C_6H_4\text{-}N(C_2H_5)(CH_2CHC_2H_5\text{-}OH)]^+ Cl^-$ with $CH_2CH_2OH$ on N | 4–5 | 5 | 93 | 93 | 4–5 | 5 |
| | Dye (I-7) | $[C_2H_5O\text{-benzothiazole-}N=N\text{-}C_6H_4\text{-}N(C_2H_5)(CH_2CHCH_3\text{-}OH)]^+ Cl^-$ with $CH_2CH_2OH$ on N | 4–5 | 5 | 93 | 93 | 4–5 | 5 |

Note:

1) Rated according to JIS L 0841.

2) Testing was carried out by heating two solutions at 120°C for 40 minutes, one containing 0.02 g/l and the other containing 0.2 g/l of dye, respectively. The figures are the ratio in percent of the absorbance at $\lambda_{max}$ of the heated dye to the unheated dye.

3) Rated with aid of the Gray Scale for the change in stain according to JIS L 0805.

Table 3
Dyeing Properties of the Present Dyes

| Dye | | Structural Formula | Light-Fastness[1] | | Stability to Hot Water[2] | | Staining[3] | |
|---|---|---|---|---|---|---|---|---|
| | | | Medium | Deep | Medium | Deep | Wool | Tetoron |
| Conventional Dyes | (A) British Patent 787,369 | $[CH_3O\text{-benzothiazole-}N=N\text{-}C_6H_4\text{-}N(C_2H_5)(C_2H_4OCH_3)]^+ Cl^-$ with $CH_3$ on N | 4–5 | 4–5 | 90 | 90 | 3–4 | 3–4 |
| | (B) Ger. Offen. 2,129,271 | $[CH_3O\text{-benzothiazole-}N=N\text{-}C_6H_4\text{-}N(C_2H_5)(C_2H_4OCH_3)]^+ Cl^-$ with $CH_2CHCH_3\text{-}OH$ on N | 4–5 | 5 | 75 | 75 | 4–5 | 5 |
| Present Dyes | Dye (I-2) (Example 3) | $[C_2H_5O\text{-benzothiazole-}N=N\text{-}C_6H_4\text{-}N(C_2H_5)(C_2H_4OCH_3)]^+ Cl^-$ with $CH_2CH_2OH$ on N | 4–5 | 5 | 90 | 93 | 4–5 | 5 |
| | Dye (I-19) (Example 5) | $[CH_3O\text{-benzothiazole-}N=N\text{-}C_6H_4\text{-}N(C_2H_5)(CH_2CHCH_3\text{-}OCH_3)]^+ Cl^-$ with $CH_2CH_2OH$ on N | 4–5 | 5 | 92 | 92 | 4–5 | 5 |
| | Dye (I-9) | $[CH_3O\text{-benzothiazole-}N=N\text{-}C_6H_4\text{-}N(C_2H_5)(CH_2CHC_2H_5\text{-}OCH_3)]^+ Cl^-$ with $CH_2CH_2OH$ on N | 4–5 | 5 | 93 | 93 | 4–5 | 5 |

Table 3 (Cont'd)

| Dye | | Structural Formula | Light-fastness[1] | | Stability to Hot Water[2] | | Staining[3] | |
|---|---|---|---|---|---|---|---|---|
| | | | Medium | Deep | Medium | Deep | Wool | Tetoron |
| Present Dyes | Dye (I-10) | [CH$_3$O-benzothiazole-N=N-C$_6$H$_3$(OCH$_3$)-N(CH$_3$)(CH$_2$CHCH$_3$OCH$_3$)]$^+$ Cl$^-$, N-CH$_2$CH$_2$OH | 4-5 | 5 | 95 | 98 | 4-5 | 5 |
| | Dye (I-11) | [C$_2$H$_5$O-benzothiazole-N=N-C$_6$H$_4$-N(C$_2$H$_5$)(CH$_2$CHCH$_3$OCH$_3$)]$^+$ Cl$^-$, N-CH$_2$CH$_2$OH | 4-5 | 5 | 93 | 93 | 4-5 | 5 |
| | Dye (I-12) | [C$_2$H$_5$O-benzothiazole-N=N-C$_6$H$_3$(CH$_3$)-N(CH$_3$)(C$_2$H$_4$OCH$_3$)]$^+$ Cl$^-$, N-CH$_2$CH$_2$OH | 4-5 | 5 | 92 | 95 | 4-5 | 5 |
| | Dye (I-13) | [CH$_3$O-benzothiazole-N=N-C$_6$H$_3$(CH$_3$)-N(C$_2$H$_5$)(C$_2$H$_4$OCH$_3$)]$^+$ Cl$^-$, N-CH$_2$CH$_2$OH | 4-5 | 5 | 95 | 97 | 4-5 | 5 |
| | Dye (I-14) | [CH$_3$O-benzothiazole-N=N-C$_6$H$_3$(CH$_3$)-N(CH$_3$)(C$_2$H$_4$OC$_2$H$_5$)]$^+$ Cl$^-$, N-CH$_2$CH$_2$OH | 4-5 | 5 | 95 | 96 | 4-5 | 5 |
| | Dye (I-15) | [CH$_3$O-benzothiazole-N=N-C$_6$H$_3$(OCH$_3$)-N(C$_2$H$_5$)(C$_2$H$_4$OCH$_3$)]$^+$ Cl$^-$, N-CH$_2$CH$_2$OH | 4-5 | 5 | 97 | 97 | 4-5 | 5 |
| | Dye (I-16) | [C$_2$H$_5$O-benzothiazole-N=N-C$_6$H$_3$(OC$_2$H$_5$)-N(CH$_3$)(C$_2$H$_4$OCH$_3$)]$^+$ Cl$^-$, N-CH$_2$CH$_2$OH | 4-5 | 5 | 95 | 95 | 4-5 | 5 |

Note:

1), 2), 3): See Table 2.

Table 4
Dyeing Properties of the Present Dyes

| Dye | | Structural Formula | Light-fastness[1] | | Stability to Hot Water[2] | | Staining[3] | |
|---|---|---|---|---|---|---|---|---|
| | | | Medium | Deep | Medium | Deep | Wool | Tetoron |
| Present Dyes | Dye (I-3) (Example 4) | [C$_2$H$_5$O-benzothiazole-N=N-C$_6$H$_3$(CH$_3$)-N(C$_2$H$_5$)(C$_2$H$_4$OH)]$^+$ Cl$^-$, N-CH$_2$CH$_2$OH | 4-5 | 5 | 95 | 98 | 4-5 | 5 |
| | Dye (I-6) | [C$_2$H$_5$O-benzothiazole-N=N-C$_6$H$_3$(CH$_3$)-N(C$_2$H$_5$)(CH$_2$CHCH$_3$OH)]$^+$ Cl$^-$, N-CH$_2$CH$_2$OH | 4-5 | 5 | 95 | 98 | 4-5 | 5 |
| | Dye (I-17) | [CH$_3$O-benzothiazole-N=N-C$_6$H$_3$(CH$_3$)-N(CH$_3$)(CH$_2$CHC$_2$H$_5$OH)]$^+$ Cl$^-$, N-CH$_2$CH$_2$OH | 4-5 | 5 | 93 | 93 | 4-5 | 5 |

Table 4 (Cont'd)

| Dye | | Structural Formula | Light-fastness[1] | | Stability to Hot Water[2] | | Staining[3] | |
|---|---|---|---|---|---|---|---|---|
| | | | Medium | Deep | Medium | Deep | Wool | Tetoron |
| Present Dyes | Dye (I-18) (Example 6) | 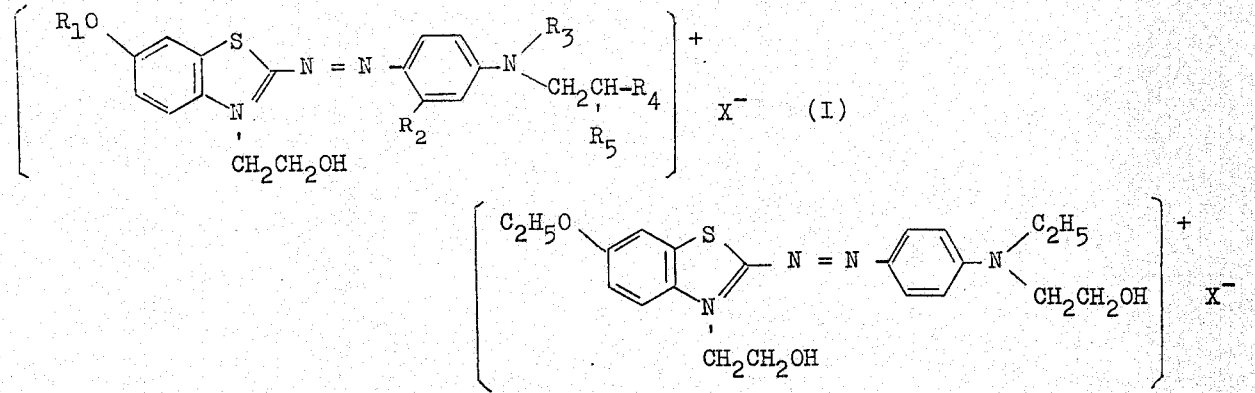 | 4-5 | 5 | 96 | 96 | 4-5 | 5 |
| | Dye (I-20) | | 4-5 | 5 | 95 | 95 | 4-5 | 5 |

Note: 1), 2), 3): See Table 2.

While the invention has been described in detail and with reference to specific embodiments thereof, it will be apparent to one skilled in the art that various changes and modifications can be made therein without departing from the spirit and scope thereof.

What we claim is:

1. A process for dyeing acid-modified polyester fibers with a cationic dye, comprising contacting said polyester fibers with a dye bath containing a cationic dye compound of the Formula (I),

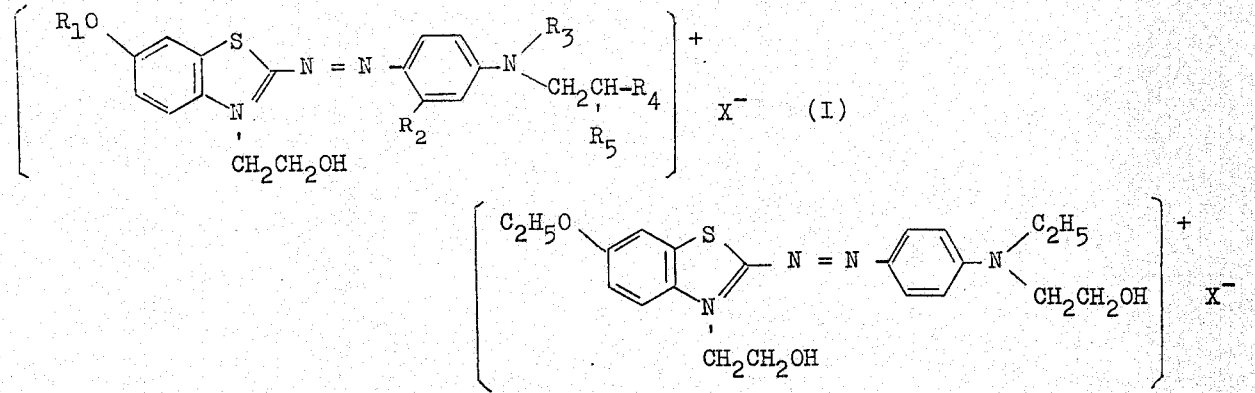

wherein $R_1$ is a one to two carbon atoms alkyl group, $R_2$ is a hydrogen atom, a one to two carbon atoms alkyl group or a one to two carbon atoms alkoxy group, $R_3$ is a one to two carbon atoms alkyl group, $R_4$ is a hydrogen atom or a one to two carbon atoms alkyl group, $R_5$ is a hydroxyl group or a one to two carbon atoms alkoxy group, and $X^-$ is an anion.

2. The process according to claim 1, wherein said dye bath is at a temperature of from 110° to 130°C.

3. The process according to claim 1, wherein the dyeing is carried out in a dye bath additionally containing a non-ionic type carrier.

4. The process according to claim 1, wherein in said compound of the Formula (I) $R_1$ is an ethyl group, $R_2$ is a hydrogen atom or a methyl group, $R_3$ is an ethyl group, $R_4$ is a hydrogen atom and $R_5$ is a hydroxyl group or a methoxy group.

5. The process according to claim 4, wherein said compound of the formula (I) is

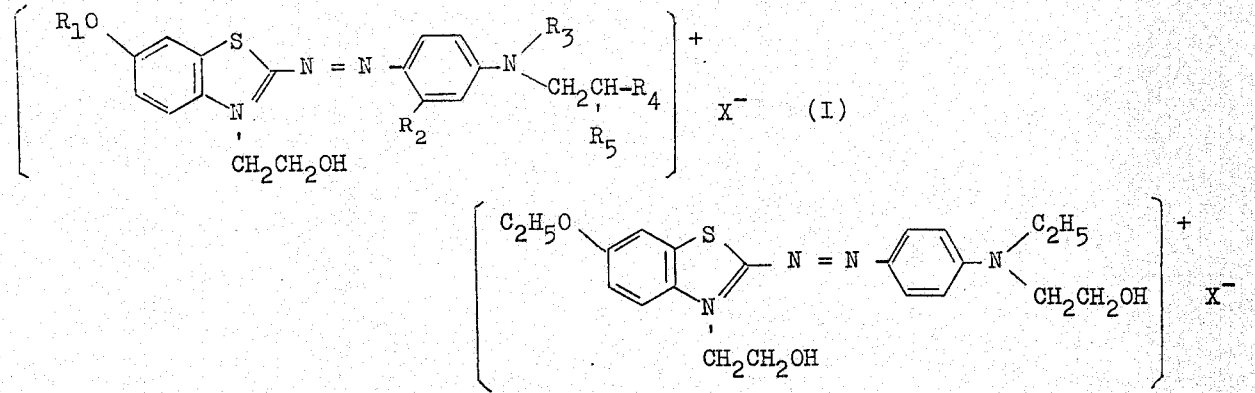

6. The process according to claim 4, wherein said compound of the Formula (I) is,

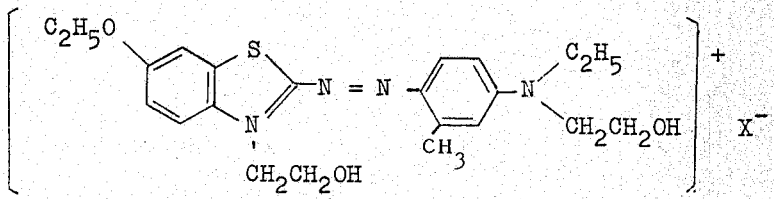

7. The process according to claim 4, wherein said compound of the Formula (I) is,

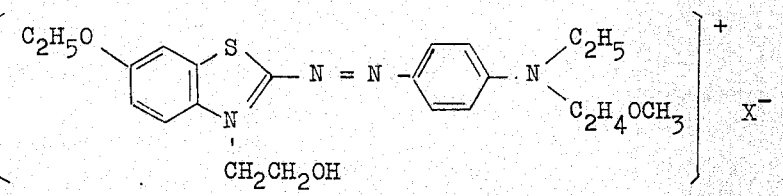

8. Acid-modified polyester fibers dyed by the process according to claim 1.

* * * * *